US006697056B1

(12) United States Patent
Bergelson et al.

(10) Patent No.: US 6,697,056 B1
(45) Date of Patent: Feb. 24, 2004

(54) METHOD AND SYSTEM FOR FORM RECOGNITION

(75) Inventors: Alan P. Bergelson, Ridgewood, NJ (US); Scott Vansickle, Hewitt, NJ (US)

(73) Assignee: WorkOnce Wireless Corporation, Ontario (CA)

( * ) Notice: Subject to any disclaimer, the term of this patent is extended or adjusted under 35 U.S.C. 154(b) by 0 days.

(21) Appl. No.: 09/480,914

(22) Filed: Jan. 11, 2000

(51) Int. Cl.[7] ................................................ G09G 5/00
(52) U.S. Cl. .................................................... 345/178
(58) Field of Search ......................... 178/18.01, 18.03, 178/19.01; 345/156, 172–174, 178, 179; 379/88.13; 382/175, 317

(56) References Cited

U.S. PATENT DOCUMENTS

| | | | |
|---|---|---|---|
| 4,752,965 A | 6/1988 | Dunkley et al. ................ 382/3 |
| 5,049,862 A | 9/1991 | Dao et al. ..................... 340/706 |
| 5,213,373 A | * 5/1993 | Ramos ............................ 283/5 |
| 5,223,677 A | 6/1993 | Kapp et al. ..................... 178/18 |
| 5,227,590 A | 7/1993 | Protheroe et al. ............. 178/18 |
| 5,317,646 A | 5/1994 | Sang, Jr. et al. ................ 382/9 |
| 5,401,916 A | 3/1995 | Crooks .......................... 178/18 |
| 5,539,159 A | 7/1996 | Protheroe et al. ............. 178/18 |
| 5,555,101 A | 9/1996 | Larson et al. ................ 358/403 |
| 5,587,560 A | 12/1996 | Crooks et al. ................. 178/18 |
| 5,629,499 A | * 5/1997 | Flickinger et al. ............. 178/18 |
| 5,734,129 A | 3/1998 | Belville et al. ................ 178/18 |
| 5,832,100 A | * 11/1998 | Lawton et al. ............... 382/100 |
| 5,869,789 A | 2/1999 | Reid-Green .............. 178/18.01 |
| 5,900,943 A | * 5/1999 | Owen ........................... 356/406 |
| 5,943,137 A | * 8/1999 | Larson et al. ................ 358/403 |

OTHER PUBLICATIONS

Railsback, "Cross merges PC with paper," InfoWorld, Mar. 29, 1999 (reprint—1 page).
A.T. Cross Co., "CrossPad User Guide," 1998.

* cited by examiner

*Primary Examiner*—Matthew C. Bella
*Assistant Examiner*—G. F. Cunningham
(74) *Attorney, Agent, or Firm*—Pearne & Gordon LLP (57) ABSTRACT

A method and system for automated identification of pre-printed forms, based on the location of a mark made manually on the form. The method comprises the steps of identifying the existence and location of a mark made manually on a form and identifying the pre-printed form based on the location of the mark. The system comprises a digitizer and a pre-printed form comprising one or more pre-printed indicators unique to the form indicating where a user is to enter one or more identifying marks. The digitizer transmits image data to a computer processor, coupled to a database, including one or more digitized images of marks made on a form. The processor identifies the existence and location of one or more identifying marks made by the user, and identifies the form based on the location of said one or more marks.

3 Claims, 8 Drawing Sheets

NURSE MANAGED DIABETES PROGRAM
EDUCATION: SUBJECT LIST II

LAST NAME  FIRST NAME
VISIT DATE  CDE INITIALS

| | SUGGEST REINFORCEMENT | INITIAL TEACHING | REINFORCEMENT | VERBALIZES UNDERSTANDING | SATISFACTORY DEMONSTRATION |
|---|---|---|---|---|---|
| HYPO/HYPERGLYCEMIA | | | | | |
| DEFINITION & CAUSES | ☐ | ☐ | ☐ | ☐ | ☐ |
| KNOWLEDGE OF SYMPTOMS & TREATMENT | ☐ | ☐ | ☐ | ☐ | ☐ |
| SICK DAY GUIDELINES | ☐ | ☐ | ☐ | ☐ | ☐ |
| CARBOHYDRATES ALWAYS AVAILABLE | ☐ | ☐ | ☐ | ☐ | ☐ |
| MEDIC ALERT/EMERGENCY SYSTEMS | ☐ | ☐ | ☐ | ☐ | ☐ |
| GLUCOGON | ☐ | ☐ | ☐ | ☐ | ☐ |
| HYPOGLYCEMIA TREATMENT | ☐ | ☐ | ☐ | ☐ | ☐ |
| GUIDELINES GIVEN | ☐ | ☐ | ☐ | ☐ | ☐ |
| NUTRITION | | | | | |
| MEAT PLANNING/PRESCRIBED DIET (SPECIFY) | ☐ | ☐ | ☐ | ☐ | ☐ |
| IMPORTANCE OF MAINTAINING BODY WEIGHT | ☐ | ☐ | ☐ | ☐ | ☐ |
| SNACK BASED ON MEAL PLAN | ☐ | ☐ | ☐ | ☐ | ☐ |
| MEAL TIMING ITS IMPORTANCE | ☐ | ☐ | ☐ | ☐ | ☐ |
| EATING OUT, ALCOHOL OTHER DIET CHANGES | ☐ | ☐ | ☐ | ☐ | ☐ |
| EXERCISE | | | | | |
| EXERCISE & GLUCOSE CONTROL | ☐ | ☐ | ☐ | ☐ | ☐ |
| REASONS FOR REGULAR, AEROBIC EXERCISE | ☐ | ☐ | ☐ | ☐ | ☐ |
| EXERCISE TIMING RELATED TO FOOD & MEDICATION | ☐ | ☐ | ☐ | ☐ | ☐ |
| EXERCISE PRECAUTIONS | ☐ | ☐ | ☐ | ☐ | ☐ |
| EXERCISE PROGRESSION | ☐ | ☐ | ☐ | ☐ | ☐ |

PAGE NO. ☐

NAME OF PROGRAM

FILE   EDIT   VIEW

⊕ ENVIRONMENTAL EXPOSURES

HAVE YOU EVER WORKED AS ONE OF THE FOLLOWING? (CHOOSE ALL THAT APPLY)

| | <THAN 1 YEAR | 1 TO 5 YEARS | 6 TO 10 YEARS | >THAN 10 YEARS |
|---|---|---|---|---|
| FLIGHT CREW/AIRLINE PILOT | ☐ | ☐ | ☐ | ☐ |
| X-RAY TECHNICIAN | ☐ | ☐ | ☐ | ☐ |
| NUCLEAR PILOT WORKER | ☐ | ☐ | ☐ | ☐ |
| CHEMICAL/PETROLEUM PLANT WORKER | ☐ | ☐ | ☐ | ☐ |
| TRANSPORTER OF CHEMICAL PETROLEUM PRODUCTS | ☐ | ☐ | ☐ | ☐ |
| EXTERMINATOR | ☐ | ☐ | ☐ | ☐ |
| WORKED ON A FARM WHERE PESTICIDES WERE USED | ☐ | ☐ | ☐ | ☐ |
| GARDENED WITH USE OF PESTICIDE | ☐ | ☐ | ☐ | ☐ |

| PROMPT | DURATION | VERIFY |
|---|---|---|
| FLIGHT CREW/AIRLINE FLIGHT PILOT | 4 TO 10 YEARS | |

START | DISTILLER | TASKS | INBOX | MICROSOFT

METHOD AND SYSTEM FOR FORM RECOGNITION

BACKGROUND

Systems are known that automatically identify forms placed on a digitizer device. (The term "form," as used herein, refers to a printed image on a page, rather than to an actual page; that is, if two pages are printed with the same image, they are considered the same form.) For example, U.S. Pat. No. 5,869,789 (Reid-Green) discusses a page recognition system that detects a page number pre-coded onto a sheet of paper when the sheet of paper is mounted on the digitizer system. The system utilizes a built-in scanner to detect a pre-coded page identifier on the back-side of the page. U.S. Pat. No. 5,555,101 (Larson et al.) discusses an automated page recognition system for forms received by facsimile and also uses a pre-printed pattern to identify a form.

U.S. Pat. No. 5,629,499 (Flickinger et al.) discloses an electronic clipboard and discusses two methods for recognizing forms used thereon. In the first method, a toggle switch is used to toggle between various form identifiers displayed on the clipboard; in the second method, a bar-code reader reads a bar-code pre-printed on the form. The toggle-display requires the clipboard to contain a micro-processor that may need to be re-programmed every time a new set of forms is used.

Figure 1A:
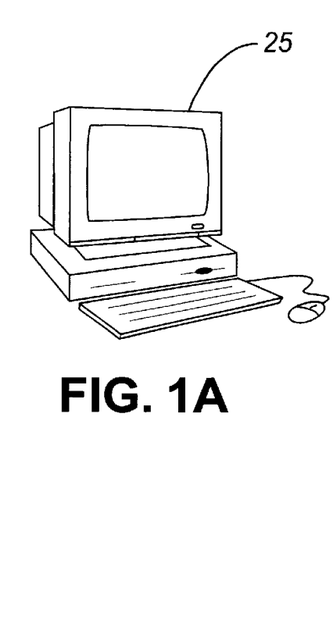
FIG. 1A displays a component of a preferred embodiment of the present invention.
Figure 1B:
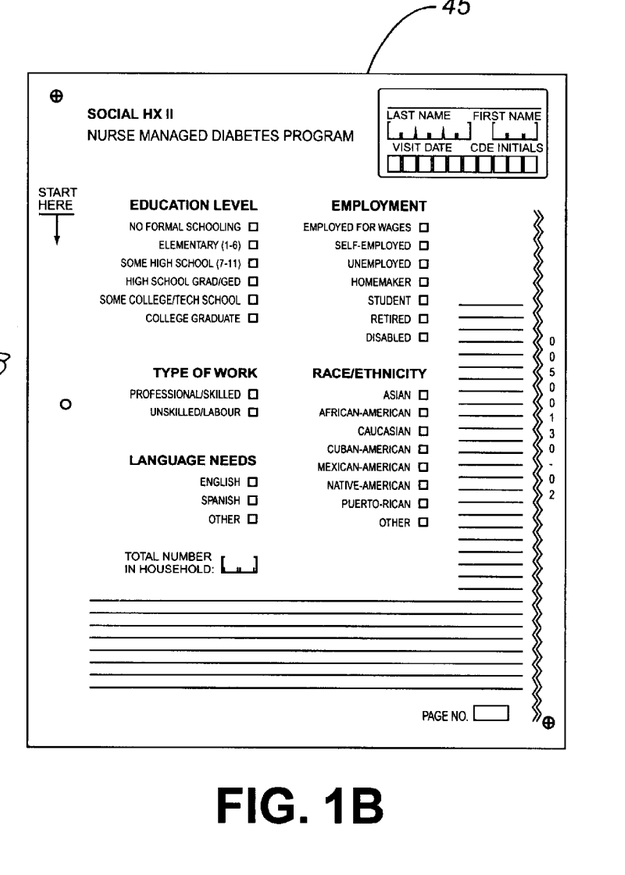
FIG. 1B displays a component of a preferred embodiment of a Preferred digitizer system.
Figure 1C:
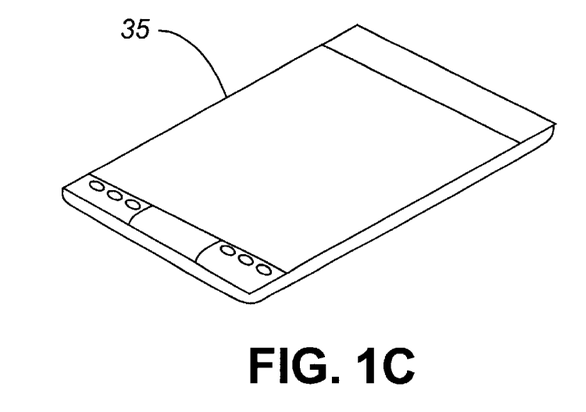
FIG. 1C displays a component of a preferred embodiment of a preferred digitizer system.

Other digitizing notepads are known that record notations made on paper forms mounted thereon. For example, A.T. Cross Company has marketed a CrossPad 35 (see FIG. 1), a portable digital notepad that digitizes and records pen movements using radio transmission. The CrossPad transmits the recorded pen movements to a personal computer for processing and analysis. The CrossPad, however, is not itself capable of identifying pre-printed forms. The information recorded by the CrossPad and transmitted to a computer only comprises the pen strokes entered by a user writing on a form. Information pre-printed on the form cannot be detected by the Crosspad. The CrossPad does not have a form ID display that can be toggled through by a user, nor does it have a bar-code reader.

Because devices such as the CrossPad only detect information that is written by a user, such devices cannot be used in systems that identify a form based on pre-printed information. Even systems such as those disclosed in Reid-Green are not capable of detecting form identification information when multiple forms are placed on the digitizer. For example, Reid-Green would only identify the form that is at the bottom of the stack. The device discussed in Flickinger et al. might be capable of reading multiple pages, but such a device requires additional (and costly) form-reading mechanisms not present in CrossPad-type devices. The use of a bar-code reader or other form-reading mechanism in a digitizer increases the cost and the weight of the digitizer.

There is therefore a need for a system of automated form identification that is capable of recognizing forms used on the CrossPad, and similar devices, without relying on pre-printed information on the forms.

There is a further need for a system that does not require a cumbersome LCD display (along with a programmable microprocessor) and toggle switch or other input device to be integrated into a CrossPad-type of electronic clipboard.

SUMMARY

The present invention comprises a method for automated identification of pre-printed forms, comprising the steps of identifying the existence and location of a mark made manually on a pre-printed form and identifying the pre-printed form by comparing the location of the mark to a database listing forms and corresponding locations of identifying marks. The invention further comprises a system for identification of pre-printed forms, comprising a digitizer; a pre-printed form comprising one or more pre-printed indicators unique to the form indicating where a user is to enter one or more identifying marks; and a computer processor, coupled with a database, that receives one or more digitized images of marks made on the form, identifies the existence and location of one or more identifying marks made by the user, and identifies the form by comparing the location of said one or more marks to a database listing forms and corresponding locations of identifying marks. The present invention also comprises computer software for automated identification of pre-printed forms, comprising software for receiving and storing data describing the location of a mark made manually on a pre-printed form and software for identifying said form by comparing the location of said mark to a database listing forms and corresponding locations of identifying marks.

DETAILED DESCRIPTION OF PREFERRED EMBODIMENTS

In a preferred embodiment, the system and method are used in conjunction with a digitizer system, shown in FIGS. 1A 1B and 1C, comprising a digitizer 35, such as a CrossPad, pre-printed forms 45, a personal computer 25, and accompanying software. Those skilled in the art will recognize that the system and method are also applicable to any digitizer system in which a form can be placed in a digitizer field. Further, although the term "form" is used in this description to refer to forms printed on paper, those skilled in the art will recognize that the disclosed system and method is equally applicable to forms embodied in other media. For example, the disclosed invention also works for forms on plastic laminates or "electronic paper" such as the "Gyricon" product developed by Xerox Corporation of Palo Alto, Calif., or a similar product developed by E Ink Corporation of Cambridge, Mass.

The general operation of the digitizer system shown in FIGS. 1A. 1B and 1C is as follows. A pre-printed data collection form 45 is placed on a CrossPad digitizer 35. A user places marks on the form 45 using the special pen that is required by the CrossPad 35. The marks made on the form 45 are recorded as digitized images by the CrossPad 35. The user connects the CrossPad 35 to a computer 25 and the CrossPad 35 transmits the images it has stored to the computer 25. In an alternate embodiment, the CrossPad is connected to a converter that converts the Crosspad data into an Internet-compatible format, and the converted CrossPad data is transmitted by the converter to a remotely located computer via the Internet. In either embodiment, the stored Crosspad images on the computer 25 are then processed by software stored on a computer. The forms and software used in a preferred embodiment are described below.

Figure 2:
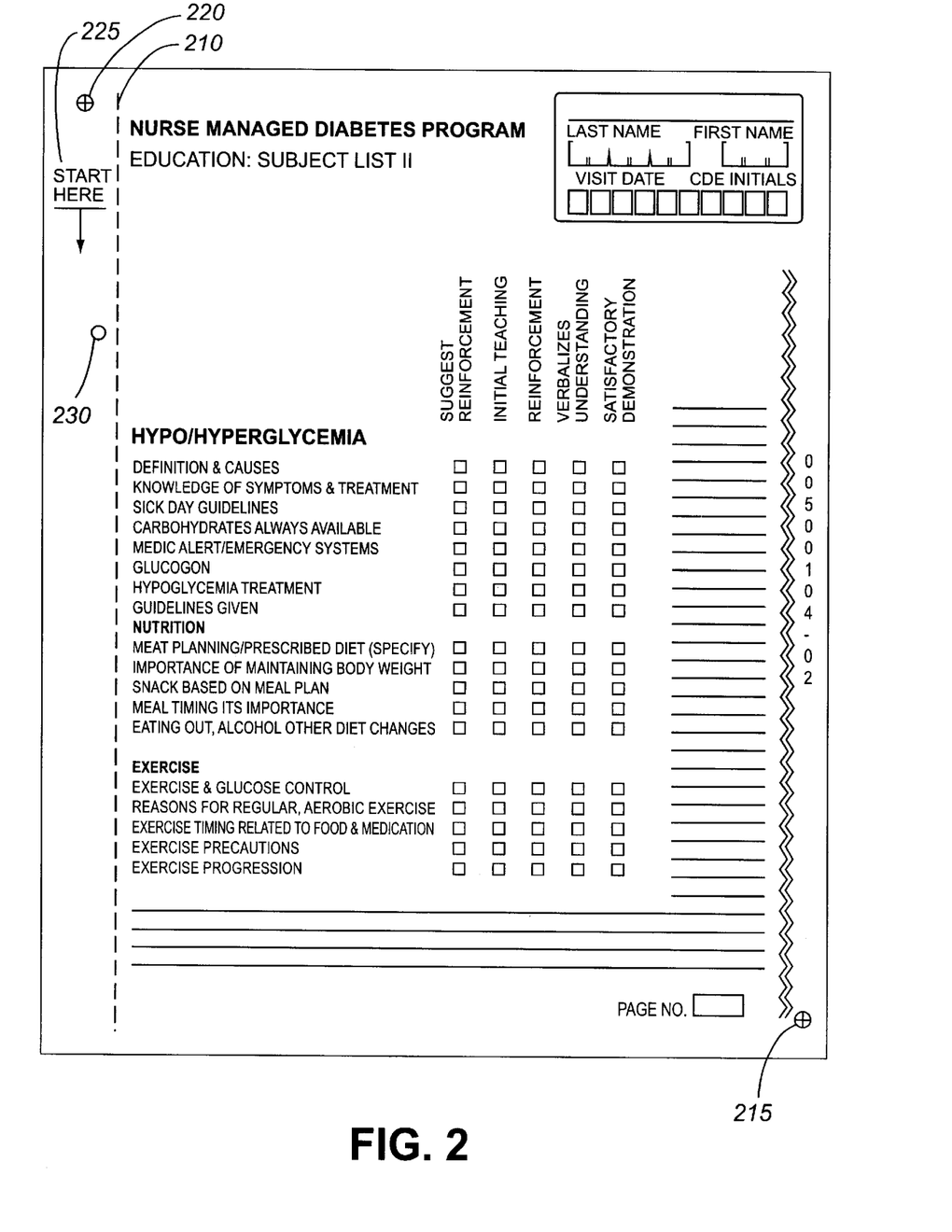
FIGS. 2 and 3 depict data collection forms used in a preferred embodiment of the present invention.

FIG. 2 depicts a first data collection form 45 used in a preferred embodiment. An area 210 at the left margin of the form is reserved for form identification. A "Start Here" instruction 225 reminds a user that an indicator 230 for a form identifier is to be filled in (the circle is the indicator; the mark made by filling in the circle is the form identifier). For each different form, the form identifier indicator 230 is located in a different zone in area 210.

The forms used in a preferred embodiment are printed so that they may be used in one or more data-entry systems. For example, the cross-hair images 215 at the lower right of the form and 220 at the upper left of the form are used to align the image of the form if it is scanned in by an optical scanner.

Figure 3:
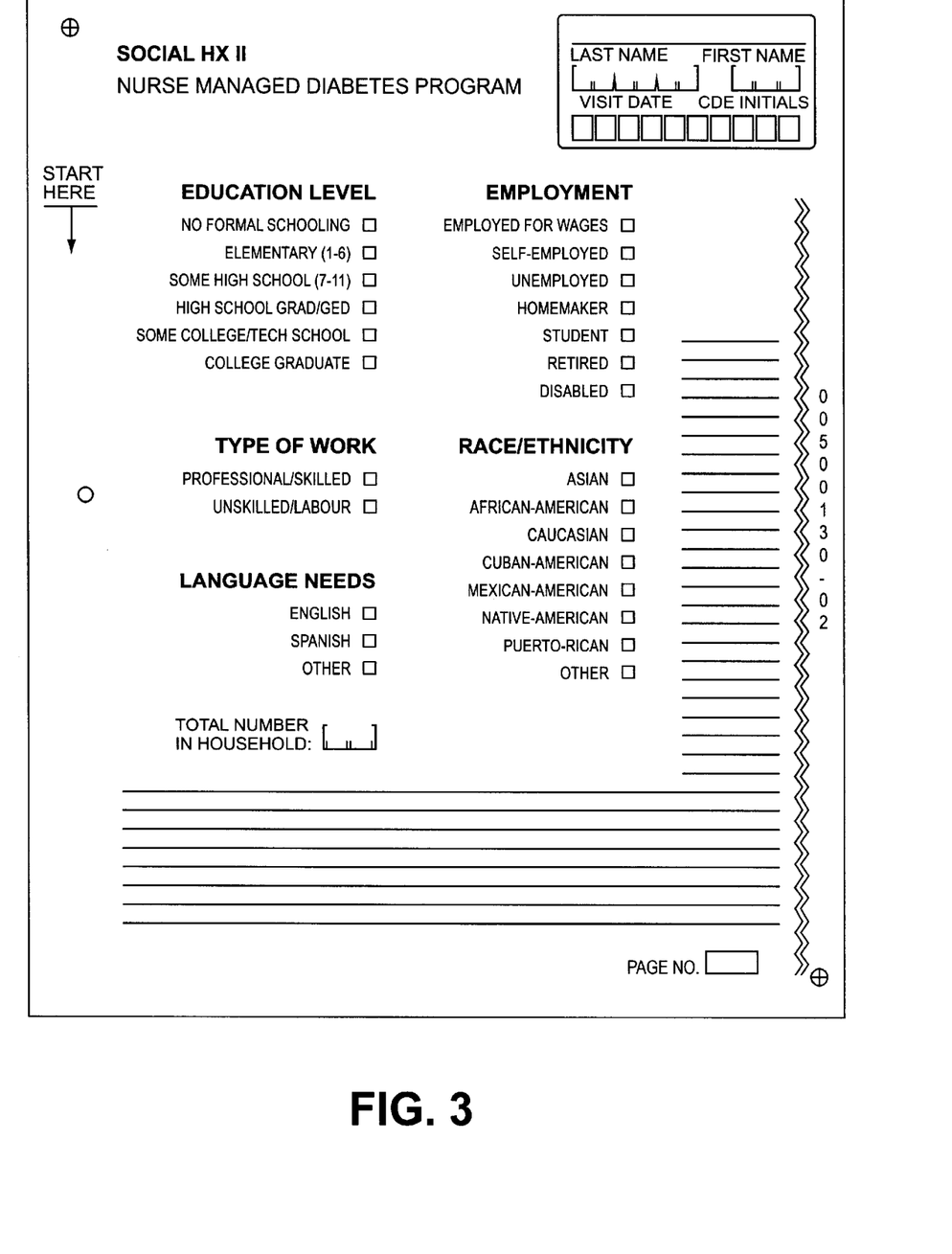

FIG. 3 depicts a second data collection form used in a preferred embodiment. The form in FIG. 3 is shown without reference numbers in order to more clearly show the appearance of forms used in a preferred embodiment. Note that the form identifier indicator on the form in FIG. 3 is located in a different zone of area 210 than the form identifier indicator 230 on the form shown in FIG. 2.

Preferably a user fills in a form identifier indicator each time the user begins to write on a form. However, to reduce errors, a first user may prefer to fill in a plurality of indicators before handing a CrossPad over to a second user. For example, a first user may use a template comprising indicators for all forms. If forms 1, 3, and 6 are to be used, the first user places the template on the CrossPad and fills in the indicator for form 1, hits the Next Page button on the CrossPad, fills in the indicator for form 3, hits the Next Page indicator again, and fills in the indicator for form 6. The first user then hits the Back Page button twice, and passes the CrossPad, with forms 1, 3, and 6 clipped thereon, to a second user. The second user can then fill in forms 1, 3, and 6 without needing to fill in the appropriate form identifier indicators (although the Next and Back page buttons will still need to be pressed when the second user goes from form to form).

Figure 4:
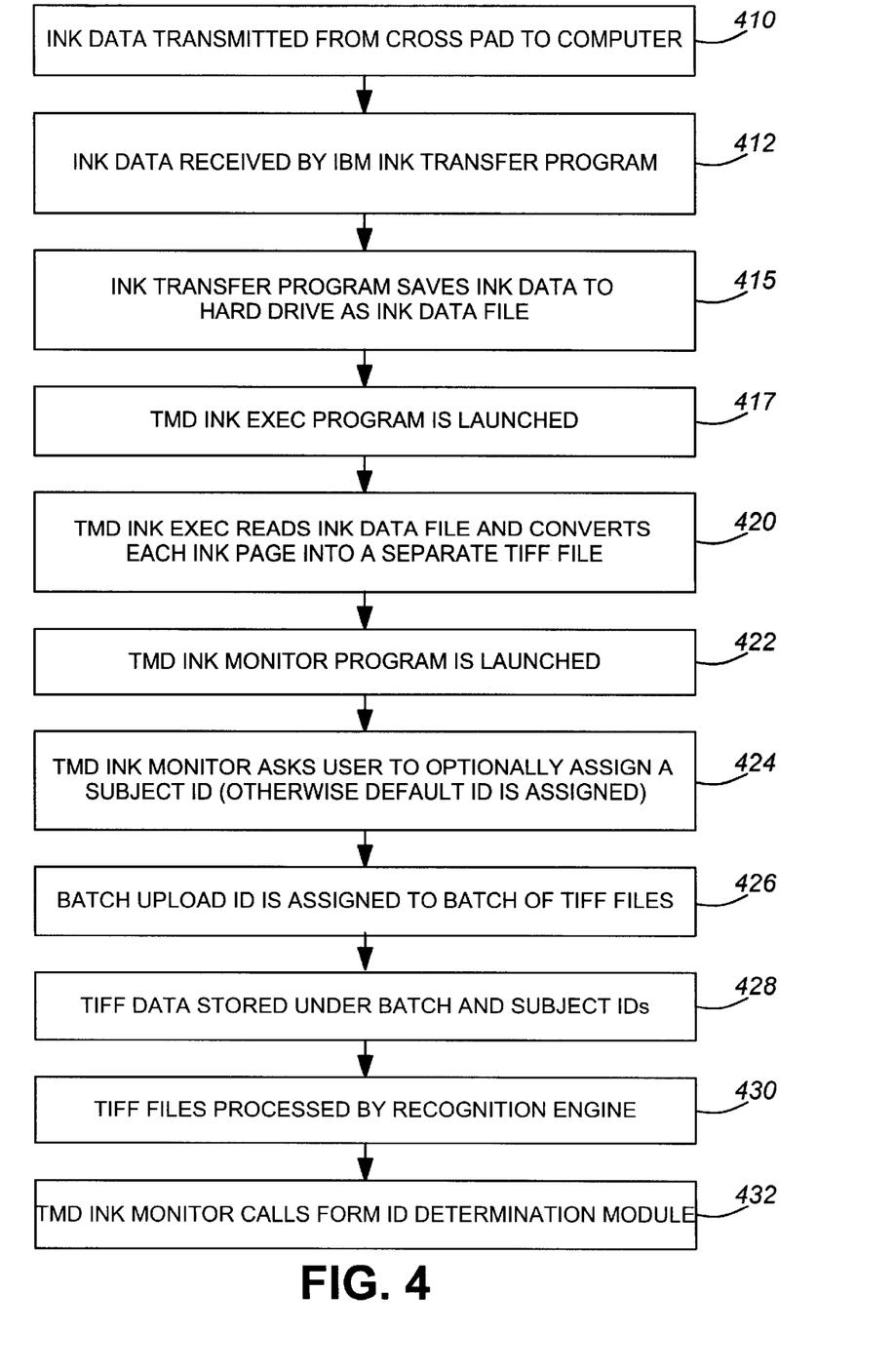
FIG. 4 is a flow diagram showing the operation of software of a preferred embodiment of the present invention.

FIG. 4 is a flow diagram showing the operation of software used in a preferred embodiment. When the form identifier indicator 230 is filled in by a user of the Crosspad 35, the image and location of the form identifier, along with image and location data for any other information written on the form by a user, is stored in the CrossPad memory. The CrossPad stores this information as "ink data," which is an IBM proprietary data format, though any suitable format for storing this data may be used. This data is referred to generally herein as ink data.

At step 410 the user uploads the collected ink data to a personal computer by plugging the CrossPad into a serial connection cable (although infrared, ethernet, or other connection devices could also be used) attached to the personal computer and then pressing a button on the Crosspad. In an alternate embodiment, the ink data is transferred first to a converter, which then sends the data to a remotely located computer, preferably over the Internet. The remotely located computer can be a personal computer, but is preferably a server-class computer (e.g., an Internet server), since it is expected that the computer will be receiving data from a plurality of sources.

At step 412 an ink transfer program stored on the personal computer receives the transferred ink data and at step 415 saves the data to the computer'shard drive as an ink data file. In a preferred embodiment, an IBM Ink Manager Transfer program, supplied with the Crosspad, performs this step and creates a file known as a "notebook."

After the ink data file is uploaded, the ink transfer program launches an ink converter program (referred to herein as TMDInkExec) at step 417. At step 420 TMDInkExec reads the uploaded ink data file and converts each ink page into a non-proprietary image file (such as group 4 TIFF, but other formats could also be used) by calling ink conversion modules included in an IBM-provided library, IBM Electric Ink SDK. TMDInkExec calls the appropriate ink conversion modules according to instructions contained in documentation included with IBM Electric Ink SDK. In an alternate embodiment, the conversion at step 420 from notebook format into non-proprietary image format can also occur at a remotely located computer: the ink data is transferred to the remote computer using, e.g., email or file transfer protocol, then the remote computer (or computers) poll multiple receiving queues (e.g., email-boxes) and perform step 420, processing the received batches of ink data.

Upon completion of step 420, the TMDInkExec program at step 422 notifies a second program, TMDInkMonitor, to further process the TIFF data. The TMDInkMonitor program, at step 424, displays a graphic interface for the user to optionally assign or confirm a subject ID to the batch of pages in the ink data file (for example, if the pages are forms that have been filled in for a particular medical patient, the patient's ID would be entered). If a scanner is used instead of a CrossPad, a subject ID label may be affixed to the form, recognized, and the recognized number assigned by the system. If a subject ID is not assigned by the user (and has not been recorded by the CrossPad), the TMDInkMonitor program assigns a default subject ID (preferably the previous subject ID incremented by 1).

A batch upload ID is assigned at step 426 to the corresponding batch of TIFF image files, and at step 428 the TIFF data is written into a database under both the batch upload ID and the subject ID. The TIFF image files are then copied out of the database and processed at step 430 by a recognition engine that turns the images into recognized data by applying OMR (optical mark read, or optical mark recognition) technology. A recognition engine is software that provides a documented set of services to another software module or program related to the transformation (recognition) of image data into computer readable text. A Caere Developer's Kit 2000 Recognition Engine, sold by Caere Corporation of Los Gatos, Calif., is used in a preferred embodiment, but numerous recognition engines are commercially available (e.g., from Mitek Systems, Inc., of San Diego, Calif., and National Computer Systems, Inc., of Minneapolis, Minn.) and could also be used in a preferred embodiment by those skilled in the art.

Figure 5:
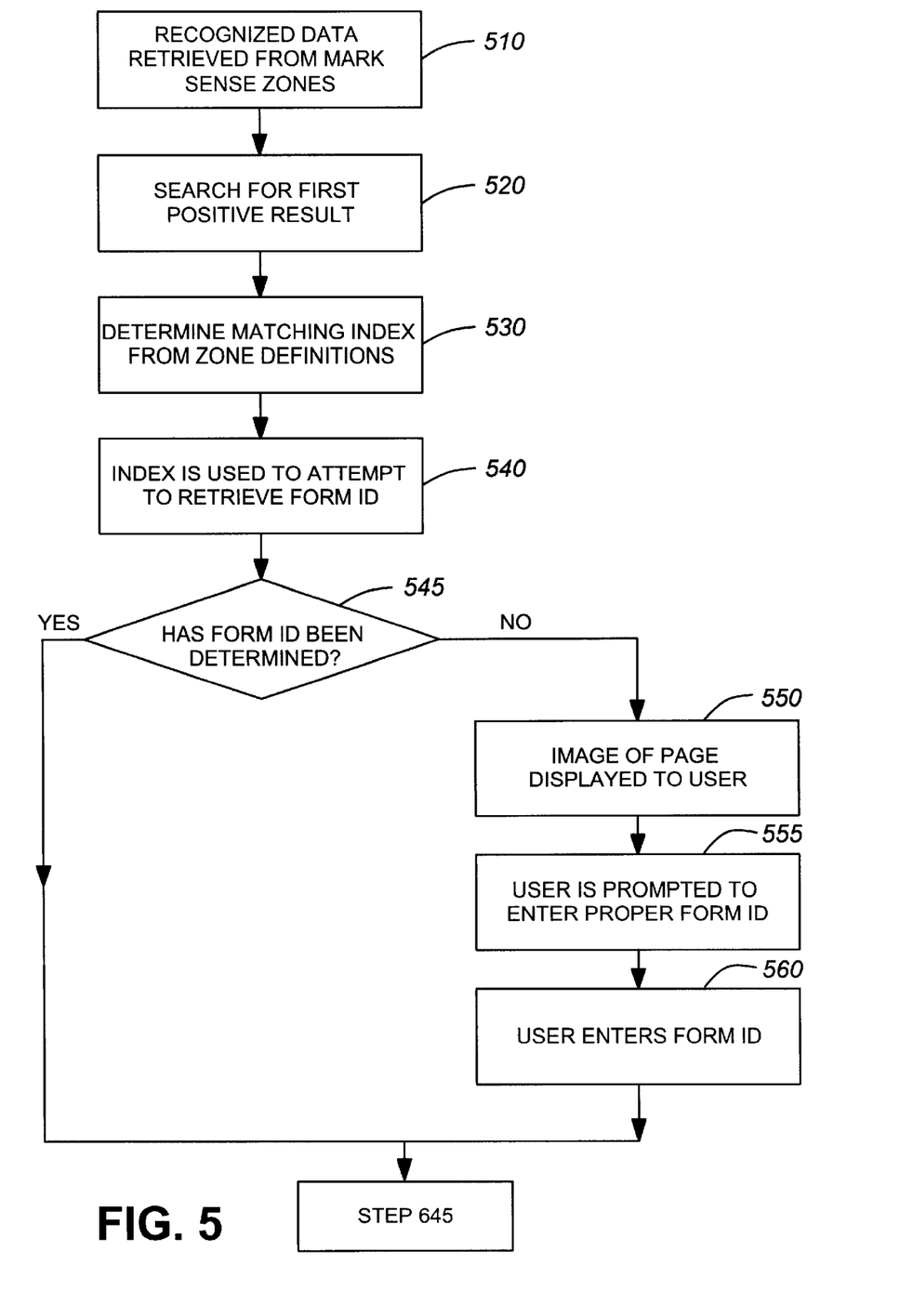
FIGS. 5 and 6 depict a flow diagram showing the operation of form recognition software of a preferred embodiment of the present invention.
Figure 6:
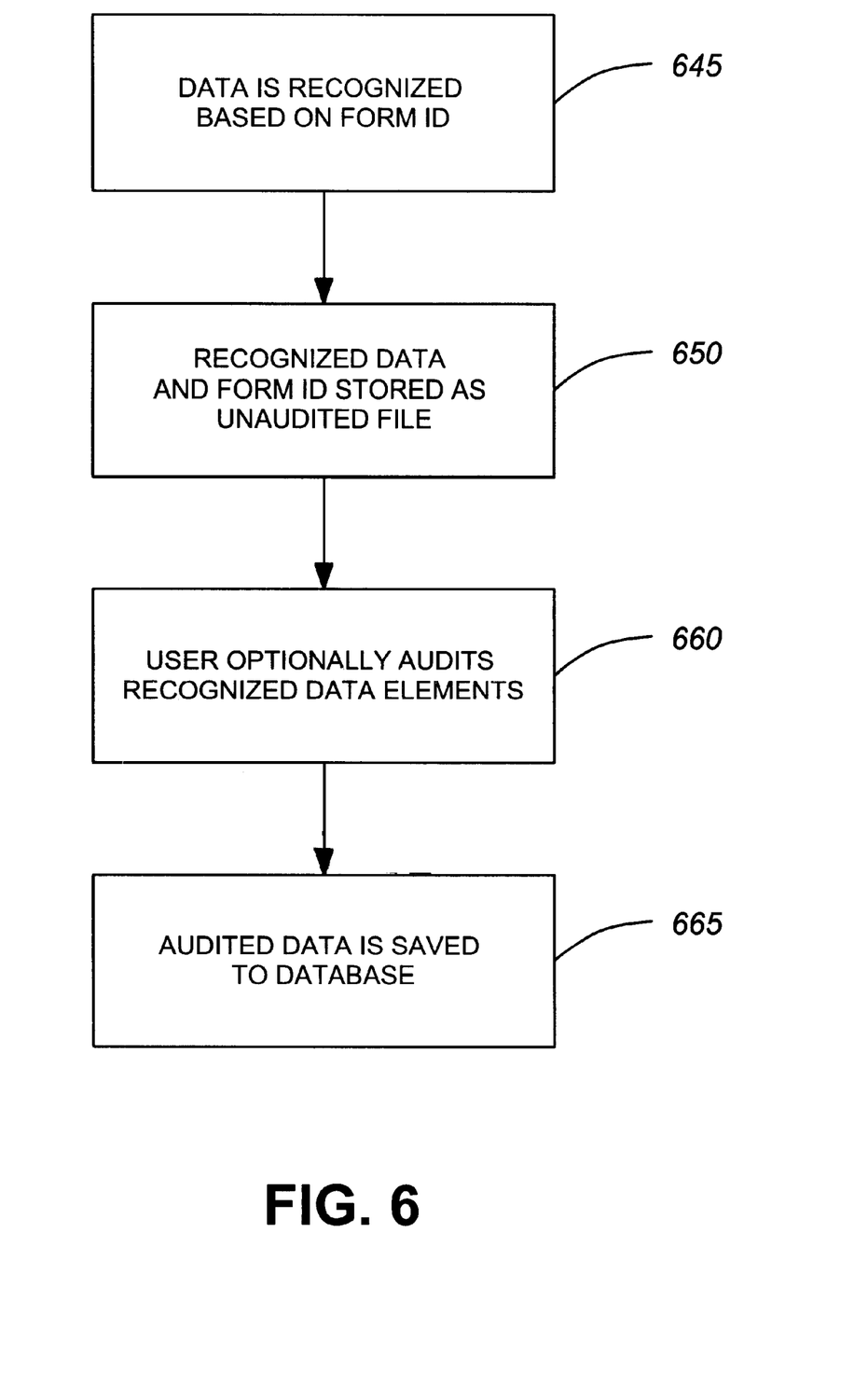

At step 432 TMDInkMonitor calls a Form ID determination module that in turn derives the form ID corresponding to the recognized data. The steps performed by the Form ID determination module are illustrated in FIGS. 5 and 6.

The form ID determination module uses an OMR Recognition Module and an OMR filling method. A recognition module is software that conforms to the specifications of a recognition engine and that transforms different types of image data into computer readable text. A filling method specifies the type of image data that is expected to appear inside a zone. Some filling methods are associated with a unique recognition module; others are supported by more than one. Some examples of filling methods are: multiple font machine print, OMR, hand-print, bar-code, dot-matrix printing, OCRA, and Braille.

A zone is an area in an image, up to full page size, containing a feature of interest to the user. In a preferred embodiment, the zones are rectangular, but those skilled in the art will recognize that differently-shaped zones can also be used. The image data covered by the zones are handled and processed separately. General zone types are graphical (no recognition), textual, and others such as bar code or OMR. To facilitate recognition of the image data in the zone areas, each zone is assigned properties based on the expected information that it will contain. The basic zone properties are x-y coordinates, size, recognition module, filter, language dictionary, and user dictionary. A language dictionary is a file that contains a language's lexical elements plus rules for generating words from them. The file can be used to mark non-dictionary words in recognized text, or to change non-dictionary words to acceptable words. Some recognition modules consult the language dictionary to help them make recognition decisions. A user dictionary contains lists of words, strings, and regular expressions defining character patterns, supplementing the content of the language dictionary file. One or more user dictionaries can be associated with a particular zone. A regular expression in a user dictionary defines a permissible pattern of characters by specifying character classes, ranges or individual characters that are valid for one or more character positions in a zone to improve recognition accuracy. A regular expression is also called a mask or a pattern. Regular expressions are usually used in form-like situations, where zone content is in some way predictable.

A Form Identification Zone Template, or FIZT) is used in identifying a form from an image. A zone template is a set of zone and page properties (corresponding, for example, to a form to be recognized) that is specified and stored, for later retrieval and processing, in a medium such as a disk file or database record. The FIZT consists of a set of zones which are laid out in a grid pattern (see FIG. 7). Filters can be applied at either the zone level or the form level to improve recognition results. Filters are specifications for the elimination of certain categories of characters from being considered as possible valid results. Examples of filters include: digits only, uppercase letters, lowercase letters, and punctuation.

Because the subject invention utilizes OMR technology, in a further preferred embodiment, non-standard symbols (such as an encircled N—analogous to the symbol©) are used to indicate pertinent information on a form. Examples of such pertinent information comprise the following: cut-and-paste areas; information that needs to be corrected; and a reference to another data file.

Figure 7:
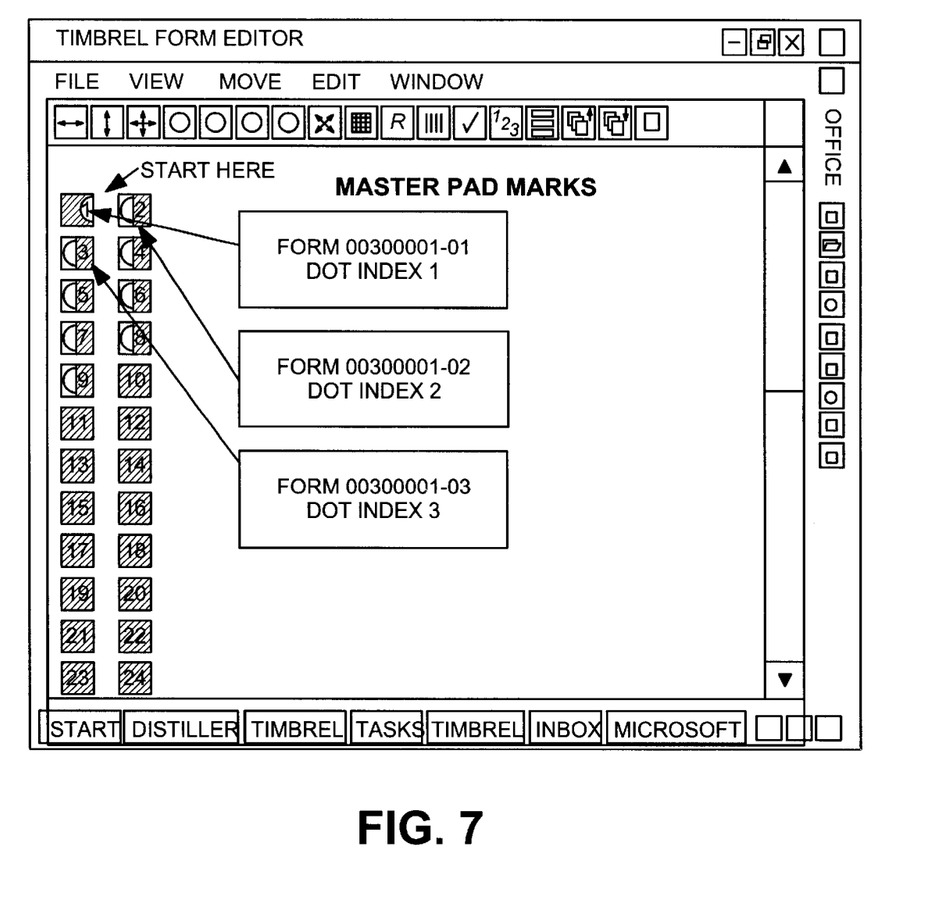
FIG. 7 illustrates placement of zones used in a preferred embodiment of the present invention.

The zones for form recognition are ordered left to right and top to bottom as shown by the shaded numbers in FIG. 7. Each zone corresponds to a form number in the set to which the form belongs. The zones are laid out with enough space between them to minimize the possibility of a false form identification caused by the writer marking outside of the circle or caused by skewing when a form is scanned in. Each form in a set is assigned a zone that corresponds to its form number, and an unfilled dot is pre-printed within the assigned zone on the form page (see FIGS. 2 and 3). Each zone, and thus each dot, is assigned a number. A table ("dot map") maps the dot number to a form number in the form set. An example table for dot mapping is as follows:

| Dot Number | Form ID Number |
|---|---|
| 1 | 00300001-01 |
| 2 | 00300001-02 |
| 3 | 00300001-03 |

The "dot map" is stored for later retrieval in a storage medium such as a database table or a disk file.

Referring to FIG. 5, at step 510 the form ID determination module retrieves recognized data from mark sense zones. At step 520 a search is performed for the first filled-in dot and corresponding zone, and at step 530 its dot number is determined from the zone definitions. At step 540, the corresponding form ID number is retrieved from a dot mapping table based on the dot number (for example, in the above table, dot number '1' corresponds to form ID number '00300001-01'). If at step 545 the form ID number has not been determined, at step 550 an ink-data-based image of the page is displayed to a user and at step 555 the user is prompted to enter the proper form ID number. At step 560, the user enters the form ID number. Although a preferred embodiment uses numbers to identify forms, those skilled in the art will recognize that alphanumeric or other symbols could also be used.

Figure 8:
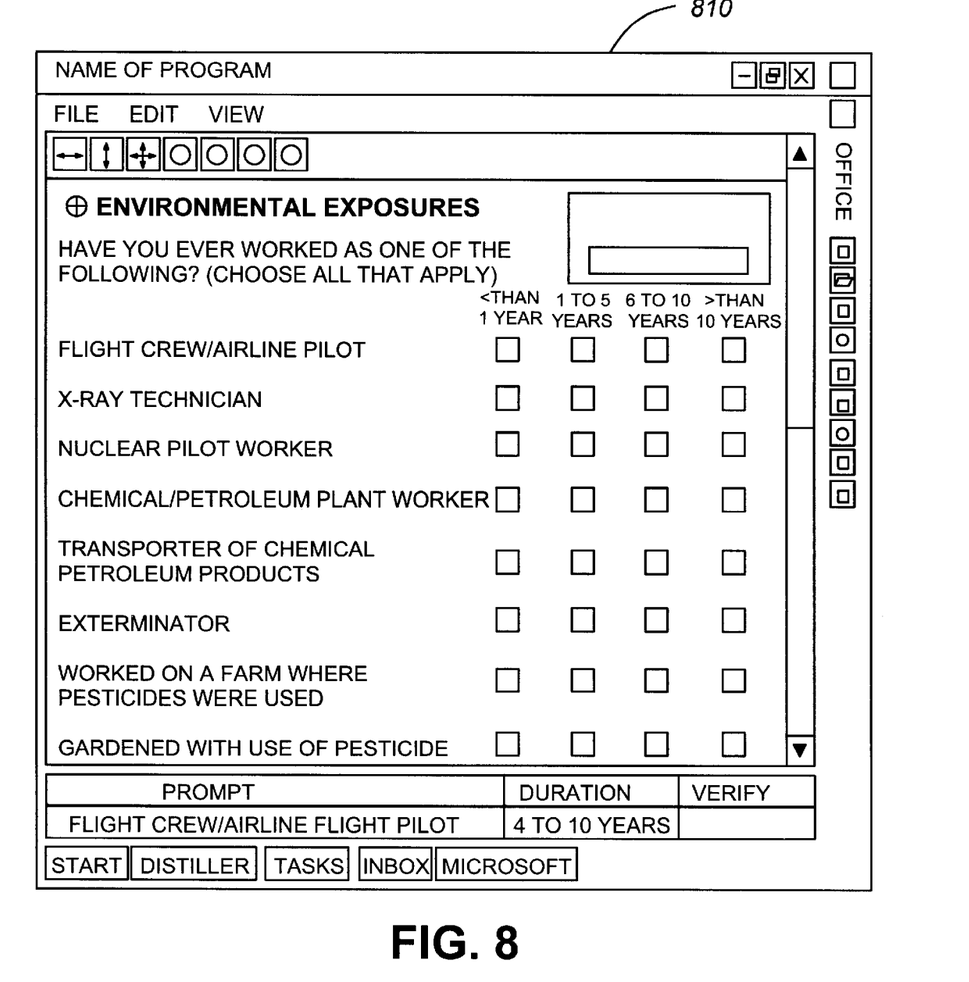
FIG. 8 depicts a graphical user interface used in a preferred embodiment of the present invention.

Referring to FIG. 6, after the form ID number has either been determined by the system or entered by a user, step 645 is performed. At step 645 the data is further recognized (applying, for example, optical character recognition, or handprint recognition-also known as ICR, for Intelligent Character Recognition), based on the form ID number, and at step 650 the recognized data and the ID number of the form on which the images were written are stored as an unaudited file in the database. The recognized data is organized according to the categories of the form and optionally displayed on a user's audit screen. The data is displayed in a format, such as a table, that is convenient for auditing. At step 660 the user optionally audits, verifies, and corrects, if appropriate, each recognized data element on the audit screen. In a preferred embodiment, a graphical user interface (GUI) 810 (see FIG. 8) enables a user to view the data in a "contextual orientation": if, for example, some data is not recognized, a user can have an image of a portion of the paper form displayed on the screen, with an image of the ink data for that page overlaid onto the image of the paper form so as to present to the user an on-screen image of a portion of the written-on paper form. This enables the user to audit and verify the data elements without having the written-on form present, and to view all of the images written on the paper form. This in turn enables an operator to perform auditing and verification at a site remotely located from the site where the paper forms have been written on. Further, when the data are, for example, medical reports, contextually-oriented on-screen viewing of the handwriting on the form enables a user to reconstruct the mood of the writer when the report was taken, as well as the personality of the patient.

At step 665 the audited data is saved to the database.

While the embodiments shown and described are fully capable of achieving the objects of the invention, it is to be understood that these embodiments are shown only for the purpose of illustration and not for the purpose of limitation. For example, a CrossPad could be easily be modified so that a user is able to skip from page to page (e.g., from page 14 directly to page 3) instead of having to repeatedly hit the page-up and page-down buttons.

What is claimed is:

1. A method of automated identification of pre-printed forms, comprising the steps of:
   (a) manually entering on a pre-printed form one or more identifying marks received as digitized image data representing said identifying marks that is received by a computer and stored in a computer storage medium;
   (b) simultaneously receiving said manually entered identifying marks into a digitizer;
   (c) digitizing said received one or more identifying marks to yield one or more digitized identifying marks;
   (d) identifying said pre-printed form from said yielded digitized identifying marks by:
      (i) establishing a form identification zone that includes said identifying marks;
      (ii) determining which form corresponds to said form identification zone;
      (iii) storing a table that matches form identification zones to form IDs;
      (iv) reformatting said received digitized image data into a format to be processed by a recognition engine;
      (v) translating said reformatted digitized image data into recognized data by processing said reformatted image data with said recognition engine;
      (vi) retrieving recognized data for one or more form identification zones;
      (vii) searching said retrieved recognized data for a zone containing said mark; and
      (viii) identifying said form by matching said zone to a form ID;
   (e) displaying said digitized image data on a computer monitor to enable a user to manually identify the form on which said image data was written; and
   (f) displaying recognized image data on said user's computer monitor in a format convenient for auditing;
   (g) displaying digitized image data superimposed on an image of the identified form so as to present an on-screen image of said form and the images written thereon; and
   (h) auditing said recognized data by comparing said recognized data to said displayed digitized image data superimposed on an image of the identified form.

2. Computer software for automated identification of pre-printed forms, comprising:
   (a) software for manually entering on a pre-printed form one or more identifying marks received as digitized image data representing said identifying marks that is received by a computer and stored in a computer storage medium;
   (b) software for simultaneously receiving said manually entered identifying marks into a digitizer;
   (c) software for digitizing said received one or more identifying marks to yield one or more digitized identifying marks;
   (d) software for identifying said pre-printed form from said yielded digitized identifying marks, having:
      (i) software for establishing a form identification zone that includes said identifying marks;
      (ii) software for determining which form corresponds to said form identification zone;
      (iii) software for reformatting said received digitized image data into a format to be processed by a recognition engine;
      (iv) software for translating said reformatted digitized image data into recognized data by processing said reformatted image data with said recognition engine;
      (v) software for retrieving recognized data for one or more form identification zones;
      (vi) software for searching said retrieved recognized data for a zone containing said mark; and
      (vii) software for identifying said form by matching said zone to a form ID;
   (e) software for storing a table that matches form identification zones to form IDs;
   (f) software for management of said digitized image data for subsequent reference;
   (g) software for displaying said digitized image data on a computer monitor to enable a user to manually identify the form on which said image data was written;
   (h) software for displaying recognized image data on said user's computer monitor in a format convenient for auditing,
   (i) software for displaying digitized image data superimposed on an image of the identified form so as to present an on-screen image of said form and the images written thereon; and
   (i) software for auditing said recognized data by comparing said recognized data to said displayed digitized image data superimposed on an image of the identified form.

3. The software of claim 2, further comprising software for recognizing pertinent information on a form based on non-standard symbols written on said form.

* * * * *

UNITED STATES PATENT AND TRADEMARK OFFICE
CERTIFICATE OF CORRECTION

PATENT NO.    : 6,697,056 B1
DATED         : February 24, 2004
INVENTOR(S)   : Alan P. Bergelson and Scott Vansickle It is certified that error appears in the above-identified patent and that said Letters Patent is hereby corrected as shown below:

Column 1,
Lines 3-5, please insert the following:
-- FIELD OF THE INVENTION
The present invention relates generally to data entry using a digitizer device and, more particularly, to a system and method for identifying forms placed on a digitizer. --.

Column 2,
Line 28, please delete the word "Preferred" and insert therefor the word -- preferred --.

Signed and Sealed this

Sixth Day of July, 2004

JON W. DUDAS
*Acting Director of the United States Patent and Trademark Office*